(12) United States Patent
Lin

(10) Patent No.: US 10,817,697 B2
(45) Date of Patent: Oct. 27, 2020

(54) FINGERPRINT IDENTIFICATION COMPONENT, ELECTRONIC DEVICE AND FINGERPRINT COLLECTION METHOD

(71) Applicant: GUANGDONG OPPO MOBILE TELECOMMUNICATIONS CORP., LTD., Dongguan, Guangdong (CN)

(72) Inventor: Yugui Lin, Guangdong (CN)

(73) Assignee: Guangdong OPPO Mobile Telecommunications Corp., Ltd., Dongguan, Guangdong (CN)

( * ) Notice: Subject to any disclaimer, the term of this patent is extended or adjusted under 35 U.S.C. 154(b) by 0 days.

(21) Appl. No.: 16/214,389

(22) Filed: Dec. 10, 2018

(65) Prior Publication Data

US 2019/0108381 A1    Apr. 11, 2019

Related U.S. Application Data

(63) Continuation of application No. PCT/CN2017/110886, filed on Nov. 14, 2017.

(30) Foreign Application Priority Data

Nov. 18, 2016  (CN) .......................... 2016 1 1036585
Nov. 18, 2016  (CN) .................... 2016 2 1257947 U

(51) Int. Cl.
*G06K 9/00* (2006.01)

(52) U.S. Cl.
CPC ......... *G06K 9/0004* (2013.01); *G06K 9/0002* (2013.01); *G06K 9/00026* (2013.01); *G06K 9/00087* (2013.01)

(58) Field of Classification Search
CPC ............... G06K 9/0004; G06K 9/0002; G06K 9/00026; G06K 9/00087
See application file for complete search history.

(56) References Cited

U.S. PATENT DOCUMENTS

| 2005/0163353 | A1 | 7/2005 | Schneider et al. |
| 2015/0198699 | A1 | 7/2015 | Kuo et al. |
| (Continued) | | | |

FOREIGN PATENT DOCUMENTS

| CN | 102073860 A | 5/2011 |
| CN | 102880860 A | 1/2013 |
| (Continued) | | |

OTHER PUBLICATIONS

Supplementary European Search Report issued in corresponding European application No. 17872401.9, dated Jun. 28, 2019 (7 pages).

*Primary Examiner* — Stephen G Sherman

(57) ABSTRACT

A fingerprint identification component is provided. The fingerprint identification component forms a micro-slit fingerprint collection region and includes a plurality of fingerprint collection modules arranged in the micro-slit fingerprint collection region. Each of the fingerprint collection modules includes a resonance transmitter and a resonance sensor. The resonance transmitter is configured to transmit a resonance signal to a fingerprint texture of a user. The resonance sensor is configured to receive the resonance signal after being reflected by the fingerprint texture, such that a fingerprint of the user can be collected or identified. An electronic device and a fingerprint collection method are also provided.

20 Claims, 5 Drawing Sheets

(56) References Cited

U.S. PATENT DOCUMENTS

2016/0056527 A1* 2/2016 Pascolini ................ H01Q 1/38
                                                                                                                   343/702
2016/0224817 A1* 8/2016 Yang ....................... G06F 1/163

FOREIGN PATENT DOCUMENTS

| | | |
|---|---|---|
| CN | 204462564 U | 7/2015 |
| CN | 104951233 A | 9/2015 |
| CN | 106778492 A | 5/2017 |
| CN | 206292809 U | 6/2017 |
| WO | 9858342 A1 | 12/1998 |

* cited by examiner

FINGERPRINT IDENTIFICATION COMPONENT, ELECTRONIC DEVICE AND FINGERPRINT COLLECTION METHOD

TECHNICAL FIELD

The present disclosure relates to the field of consumer devices in general. More particularly, and without limitation, the disclosed embodiments relate to a fingerprint identification component, an electronic device and a fingerprint collection method.

BACKGROUND

Currently, a fingerprint identification component of a mobile phone may include a fingerprint collection region having a large area. Therefore, the fingerprint identification component may occupy too much surface area of the mobile phone, and the user has poor experience

SUMMARY

In accordance with an aspect, in one embodiment of the present disclosure, a fingerprint identification component is provided. The fingerprint identification component defines a micro-slit fingerprint collection region and includes a multiple fingerprint collection modules arranged in the micro-slit fingerprint collection region. Each of the fingerprint collection modules includes a resonance transmitter and a resonance sensor. The resonance transmitter is configured to transmit a resonance signal to a fingerprint texture of a user. The resonance sensor is configured to receive the resonance signal after being reflected by the fingerprint texture of the user, such that a fingerprint of the user is collected or identified.

In accordance with an aspect, in further another embodiment of the present disclosure, an electronic device is provided. The electronic device includes the fingerprint identification component mentioned above. The electronic device further includes a housing. The fingerprint identification component is received in the housing. The housing defines a resonance signal transmission region cover the fingerprint collection region. The fingerprint identification component defines a micro-slit fingerprint collection region and includes a multiple fingerprint collection modules arranged in the micro-slit fingerprint collection region. Each of the fingerprint collection modules includes a resonance transmitter and a resonance sensor. The resonance transmitter is configured to transmit a resonance signal to a fingerprint texture of a user. The resonance sensor is configured to receive the resonance signal after being reflected by the fingerprint texture of the user, such that a fingerprint of the user is collected or identified.

In accordance with another aspect, in further another embodiment of the present disclosure, a fingerprint collection method is provided. The fingerprint collection method includes:

a resonance transmitter continuously transmitting a resonance signal to an object; a resonance sensor continuously receiving the resonance signal reflected by the object, and recording the received resonance signal every time;

when a current resonance signal received by the resonance sensor is not identical to a previous resonance signal received, recording the current resonance signal as an effective feedback signal;

generating a fingerprint image based on the effective feedback signals successively received by the resonance sensor.

BRIEF DESCRIPTION OF THE DRAWINGS

The accompanying drawings, which are incorporated in and constitute a part of this specification, illustrate exemplary embodiments of the present disclosure, and together with the description, serve to explain the principles of the disclosure.

DETAILED DESCRIPTION OF EMBODIMENTS

This description and the accompanying drawings that illustrate exemplary embodiments should not be taken as limiting. Various mechanical, structural, electrical, and operational changes may be made without departing from the scope of this description and the claims, including equivalents. In some instances, well known structures and techniques have not been shown or described in detail so as not to obscure the disclosure. Similar reference numbers in two or more figures represent the same or similar elements. Furthermore, elements and their associated features that are disclosed in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

As used herein, a "communication terminal", "electronic device" or simply a "terminal") includes, but is not limited to, a device that is configured to receive/transmit communication signals via a wire line connection, such as via a public-switched telephone network (PSTN), digital subscriber line (DSL), digital cable, a direct cable connection, and/or another data connection/network, and/or via a wireless interface with, for example, a cellular network, a wireless local area network (WLAN)1 a digital television network such as a DVB-H network, a satellite network, an AM/FM broadcast transmitter, and/or another communication terminal. A communication terminal or an electronic device that is configured to communicate over a wireless interface may be referred to as a "wireless communication terminal," a "wireless terminal" and/or a "mobile terminal." Examples of mobile terminals and electronic devices include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

Figure 1:
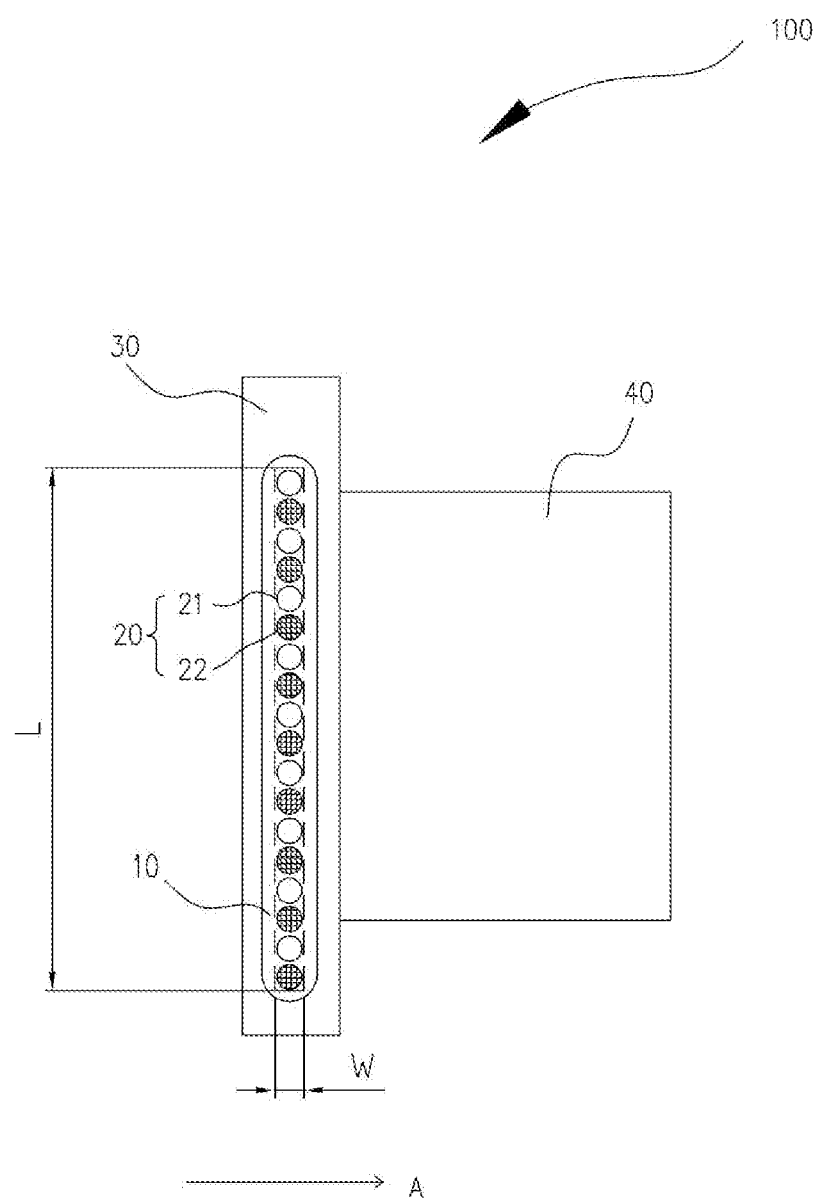
FIG. 1 illustrates a schematic projection view of a fingerprint identification component, in accordance with an embodiment of the present disclosure.
Figure 2:
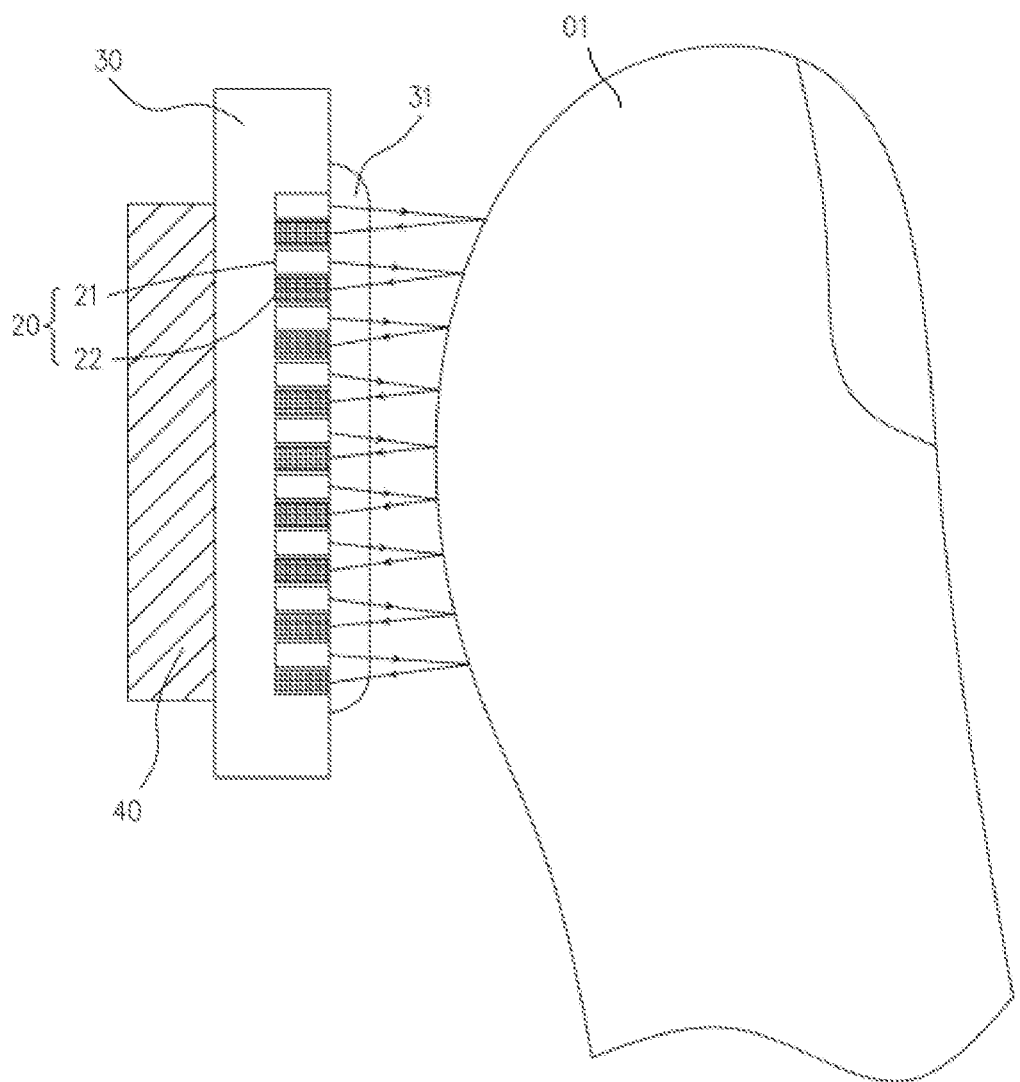
FIG. 2 illustrates a schematic cross-sectional view of the fingerprint identification component of FIG. 1.

As illustrated in FIG. 1 and FIG. 2, a fingerprint identification component 100 is provided, in accordance with an embodiment of the present disclosure. The fingerprint identification component 100 defines a micro-slit fingerprint collection region 10 thereon. The fingerprint identification component 100 includes a multiple fingerprint collection modules 20 arranged in the micro-slit fingerprint collection region 10. Each of the fingerprint collection modules 20 includes a resonance transmitter 21 and a resonance sensor 22 (as illustrated in a shaded region of FIG. 1). The resonance transmitter 21 is configured to transmit a resonance signal to a fingerprint texture of a user. The resonance sensor 22 is configured to receive the resonance signal reflected by the fingerprint texture of the user, such that the fingerprint of the user can be collected or identified.

The fingerprint identification component 100 can be able to collect a fingerprint information of a region on the fingerprint texture when the region is facing the micro-slit fingerprint collection region 10. When the fingerprint texture of the user moves across the micro-slit fingerprint collection region 10 in a certain direction, the multiple fingerprint collection modules 20 may continuously collect partial fingerprint information of the user. So that a fingerprint image can be generated by the fingerprint identification component 100 based on the partial fingerprint information. Therefore a fingerprint collection is achieved. The fingerprint identification component 100 can be applied to an electronic device. The electronic device may be a mobile phone, a notebook computer, or a tablet computer.

In the illustrated embodiment, the micro-slit fingerprint collection region 10 has a micro-slit shape. The micro-slit fingerprint collection region 10 has a length L and a width W. The length L ranges from 10 mm to 20 mm. The width W ranges from 0.5 mm to 5 mm. In other alternative embodiments, the micro-slit fingerprint collection region 10 may have other shape such as an elliptical micro-slit shape.

In this embodiment, the multiple fingerprint collection modules 20 are arranged on a same plane of the micro-slit fingerprint collection region 10. That is, the multiple resonance transmitters 21 and the multiple resonance sensors 22 are also disposed on a same plane. After the resonance signal is emitted by the resonance transmitter 21, the resonance sensor 22 may receive the resonance signal if the resonance signal is reflected by the fingerprint texture of the user. So that a time lag between the resonance signal being emitted and the reflected resonance being received signal can be acquired, and then a distance between a reflecting portion of the fingerprint texture can be calculated, according to a velocity of the resonance signal. Because the multiple resonance transmitters 21 all emit resonance signal on the same plane, the multiple resonance sensors 22 also receive resonance signal on the same plane, thereby the fingerprint identification component 100 can collect or identify the fingerprint accurately.

Furthermore, the multiple fingerprint collection modules 20 are arranged along a direction of the length of the micro-slit fingerprint collection region 10.

In this embodiment, the multiple fingerprint collection modules 20 are arranged in a row along a straight line, and each of the fingerprint collection modules 20 is disposed closely to an adjacent one thereof. Therefore, the width W of the micro-slit fingerprint collection region 10 can be effectively reduced, and an occupied space of the fingerprint identification component 100 can be reduced. In other alternative embodiments, the multiple fingerprint collection modules 20 may be arranged in two rows along a direction of the length of the micro-slit fingerprint collection region 10, or in three rows, or in multiple rows.

Furthermore, the resonance transmitter 21 and the resonance sensor 22 of each of the fingerprint collecting modules 20 are arranged side by side in a direction perpendicular to or parallel with a longitudinal direction of the micro-slit fingerprint collection region 10. In other words, the resonance transmitter 21 and the resonance sensor 22 of each of the fingerprint collecting modules 20 are disposed in a row along a direction perpendicular to or parallel with a longitudinal direction of the micro-slit fingerprint collection region 10.

In the illustrated embodiment, the resonance transmitter 21 and the resonance sensor 22 of each of the fingerprint collecting modules 20 are arranged in a row along the longitudinal direction of the micro-slit fingerprint collection region 10. Such that the multiple resonance sensors 22 can be separated from each other by one resonance transmitter 21, and the multiple resonance transmitters 21 are separated from each other by one resonance sensor 22. Therefore the multiple fingerprint collection modules 20 can be ensured to collect the fingerprint information collected in synchronization.

In other alternative embodiments, the resonance transmitter 21 and the resonance sensor 22 of each of the fingerprint collection modules 20 are closely juxtaposed in a direction of the width of the micro-slit fingerprint collection region 10. The resonance transmitters 21 of all of the fingerprint collection modules 20 are arranged in a first row. The first row may be parallel to the longitudinal direction of the micro-slit fingerprint collection region 10. The resonance sensors 22 of all of the fingerprint collection modules 20 are arranged in a second row. The second row may be adjacent and parallel to the first row.

Furthermore, the fingerprint identification component 100 further includes a substrate 30 and a circuit board 40. The multiple fingerprint collection modules 20 are assembled onto the substrate 30. The circuit board 40 is electrically coupled to the multiple fingerprint collection modules 20 via the substrate 30.

In the illustrated embodiment, the substrate 30 is made of aluminum. The substrate 30 is configured to carry the multiple fingerprint collection modules 20. Such that a structure of the fingerprint identification component 100 is ensured to be stable. Specifically, the multiple fingerprint collection modules 20 may be coupled to a side of the substrate 30 facing the user, and is integrated with the substrate 30.

In some embodiment, the fingerprint identification component 100 further includes a light guide lens 31. The light guide lens 31 may has a strip-shaped. The light guide lens 31 is fixed to the side of the substrate 30 facing the user. The light guide lens 31 faces the fingerprint collection region 10 to guide the resonance signals transmitted or received by the multiple fingerprint collecting modules 20. The circuit board 40 is coupled to a side of the substrate 30 opposite to the user. In some embodiment, the circuit board 40 may be coupled to the substrate 30 by soldering. The circuit board 40 is electrically coupled to the multiple fingerprint collection modules 20 via conductors of the substrate 30. The circuit board 40 is configured to provide power to the multiple fingerprint collection modules 20 and further configured to transmit and receives a fingerprint collection command. The circuit board 40 may be a flexible printed circuit board. So that the fingerprint identification component 100 can be disposed on any position of an electronic device.

Furthermore, the resonance transmitter 21 may be a laser transmitter. The resonance sensor 22 may be a laser sensor. The resonance transmitter 21 is configured to transmit a laser signal to the fingerprint texture of the user, and the resonance sensor 22 receives the laser signal reflected by the fingerprint texture of the user. Thereby a distance between the fingerprint collecting module 20 and the fingerprint texture of the user can be acquired. When a finger of the user moves with respect to the micro-slit fingerprint collection region 10 in a predetermined direction, the multiple fingerprint collection modules 20 can scan the fingerprint texture of the user, a fluctuation of peaks and troughs of the fingerprint of the fingerprint texture may be captured. The fingerprint is detected when the fingerprint collection modules 20 are scanning, and a fingerprint image of the user may be generated based on the fingerprint. In this embodiment, the finger of the user moves with respect to the fingerprint collection region 10 in a direction perpendicular to the length direction A of the fingerprint 10 perpendicularly.

Figure 3:
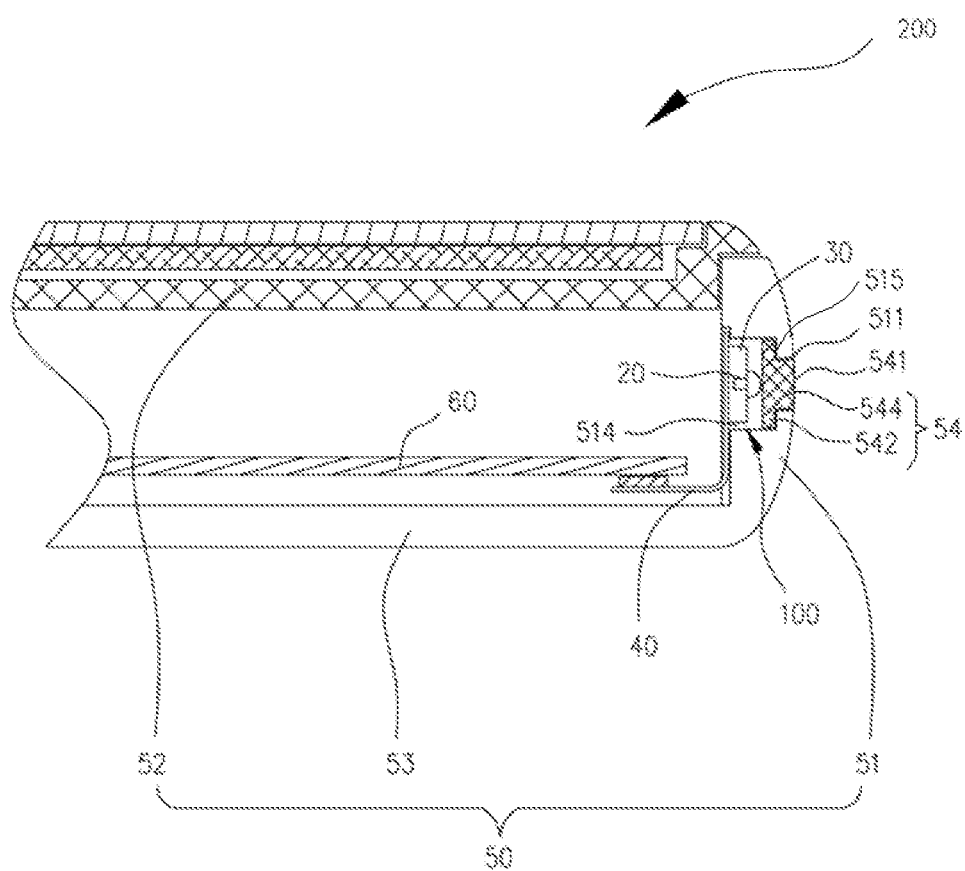
FIG. 3 illustrates a partial cross-sectional view of an electronic device, in accordance with an embodiment of the present disclosure.
Figure 4:
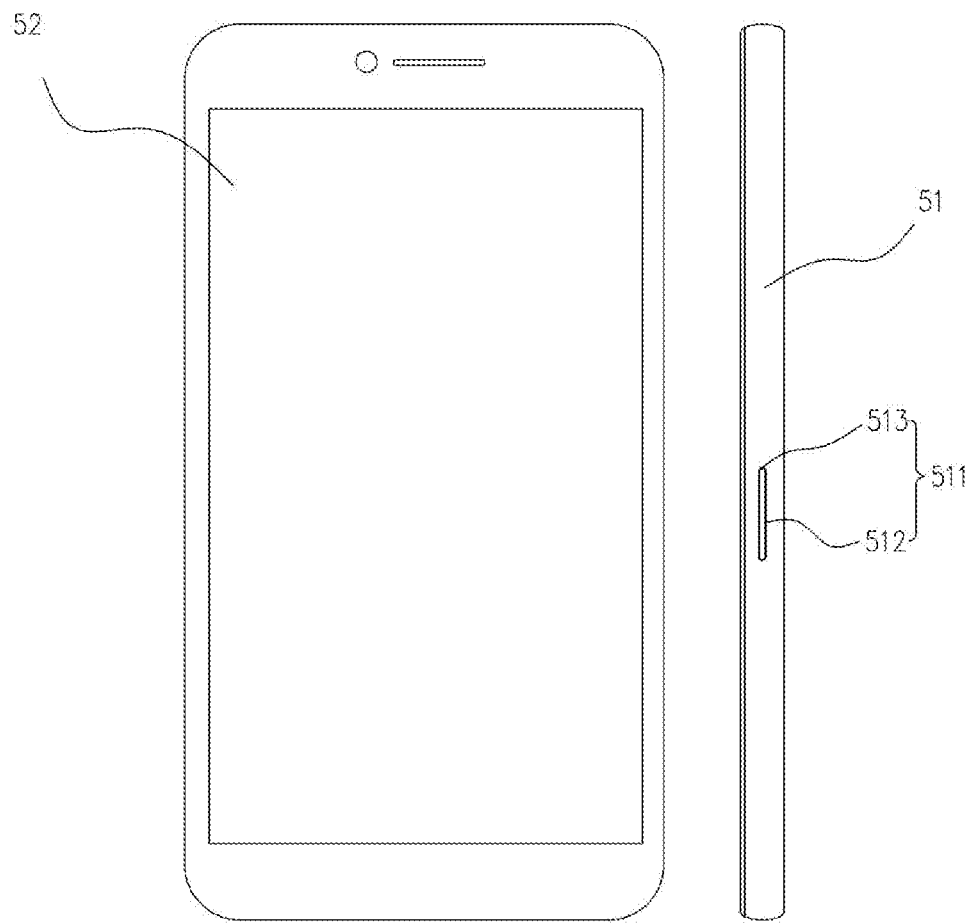
FIG. 4 illustrates a schematic view of a front cover and a frame of an electronic device, in accordance with an embodiment of the present disclosure.

As illustrated in FIG. 3 and FIG. 4, an electronic device 200 is provided in accordance with another embodiment of the present disclosure. The electronic device 200 includes the fingerprint identification component 100. The electronic device 200 further includes a housing 50. The fingerprint identification component 100 is received in the housing 50. The housing 50 defines a resonance signal transmission region thereon. The resonance signal transmission region covers the micro-slit fingerprint collection region 10. Each of the resonance transmitters 21 is configured to transmit a resonance signal to pass through the resonance signal transmission region, and each of the resonance sensors 22 is configured to receive a resonance signal passing through the resonance signal transmission region.

In this embodiment, the housing 50 may be an outer casing of the electronic device 200. The housing 50 is configured to protect the fingerprint identification component 100 from damage. Furthermore, the housing 50 provides a fingerprint collection environment for the fingerprint collection module 20 of the fingerprint identification component 100. Such that the resonance sensor 22 can be prevented from being disturbed by any external disturbance resonance signal when receives the resonance signal reflected by the fingerprint texture of the user. The housing 50 allows the resonance signal transmitted by the resonance transmitter 21 to pass only through the resonance signal transmission region, and allows the resonance signal reflect by the fingerprint texture to pass through and arrive to the resonance sensor 22. The housing 50 may be made of a plastic material, a metal material, a ceramic material, or a glass material.

Furthermore, the housing 50 further includes a frame 51. The resonance signal transmission region is formed on the frame 51.

In this embodiment, the housing 50 further includes a front cover 52 and a rear cover 53. The front cover 52 is fixed to an inner side of the frame 51. The front cover 52 is configured to cover a front side of the frame 51. The rear cover 53 is disposed oppositely to the front cover 52. The rear cover 53 is configured to cover a rear side of the frame 51. In some embodiments, the rear cover 53 can be integrated with the frame 51.

The resonance signal transmission region is disposed on the frame 51. That is, the fingerprint identification component 100 is disposed inside the housing 50 oppositely to the resonance signal transmission region. In this embodiment, the fingerprint identification component 100 can be embedded in the frame 51. In a cross-sectional view of the electronic device 200 taken along a direction of a width thereof, the fingerprint identification component 100 may be stacked on a portion of the frame 51 in a direction of a width of the electronic device 200, thereby preventing the fingerprint identification component 100 from being stacked on other components in a direction of a thickness of the electronic device 200. Thereby the thickness of the terminal 200 can be effectively reduced. In other alternative embodiments, the resonance signal transmission region may also be disposed on the front cover 52 or the rear cover 53.

Furthermore, the frame 51 defines a slit 511 corresponding to the resonance signal transmission region. The housing 50 further includes a transparent cover 54. The transparent cover 54 is embedded in the slit 511.

In the embodiment, a contour of the slit 511 has an elliptical shape. The slit 511 includes two long edges 512 and two short edges 513. The two long edges 512 are oppositely disposed. And both of the two long edges 512 are extending along the longitudinal direction of the micro-slit fingerprint collection region 10. The two short edges 513 are oppositely disposed. Both of the two short edges 513 have a semicircular shape. Each of the short edges 513 is coupled between the two straight edges 512.

The frame 51 includes an outer surface dispose at a periphery thereof. The outer surface is a curved surface. The slit 511 is defined on the outer surface of the frame 51 and is located at a portion of maximum curvature of the outer surface. A longitudinal direction of the slit 511 is parallel to a longitudinal direction of the frame 51. So that an exterior surface of the frame 51 is effectively utilized. A width of the frame 51 can be sufficiently small, so that a thickness of the electronic device 200 can be small enough to improve the user experience. The transparent cover 54 is partially received in the slit 511 to cover the slit 511. Such that the fingerprint identification, component 100 is protected by the transparent cover 54. And the transparent cover 54 allows the laser signal emitted by the resonance transmitter 21 to pass through, and allows the laser signal reflected by the fingerprint texture of the user to pass through and arrive to the resonance sensor 22.

In this embodiment, the transparent cover 54 includes an exterior surface 541 facing the user. The exterior surface 541 is a curved surface. The exterior surface 541 is aligned with the outer surface of the frame 51. When a finger of the user moves on the exterior surface 541, the multiple fingerprint collection modules 20 can collect the fingerprint information of the user through the transparent cover 54. In other embodiments, the exterior surface 541 may be a planar surface, such that the fingerprint identification component 100 can be ensured to collect the fingerprint information accurately.

Furthermore, the frame 51 defines a receiving depression 514 in an interior surface thereof. The receiving depression is 514 is communicated with the slit 511. The multiple fingerprint collection modules 20 are disposed in the receiving depression 514.

In this embodiment, the multiple fingerprint collection modules 20 and the substrate 30 are received in the receiving depression 514. So that the fingerprint identification component 100 and the frame 51 are structurally stable, and a use space of the frame 51 is effectively utilized.

In some embodiment, the frame 51 further includes a step 515 disposed on a bottom surface of the receiving depression 514 with respect to the slit 511. The transparent cover 54 comprises a flange 542 and an embedded portion 544. The embedded portion 544 is embedded in the slit 511. The flange 542 is coupled to an end of the embedded portion 544 far away from the exterior surface 541. In some embodiments, the flange 542 is disposed at a periphery of the embedded portion 544. The flange 542 is stacked on the step 515, so that the transparent cover 54 is partially mounted to the receiving depression 514, thereby improving a structural stability of the transparent cover 54 and the frame 51.

The flange 542 is disposed on a periphery of the transparent cover 54, thereby a structure of the transparent cover 54 can be strengthened, and a service life of the housing 50 can be extended. The multiple fingerprint collection modules 20 are received in the receiving depression 514 and disposed opposite to the slit 511. The substrate 30 is disposed in an opening of the receiving depression 514 away from the slit 511. The circuit board 40 is couple to a surface of the substrate 30 departing away from the slit 511. The circuit board 40 may protrude out of receiving depression 514. The circuit board 40 is bent and coupled to a main board 60 of the electronic device 200. So that the main board 60 can generate and send a fingerprint collection command to the fingerprint identification component 100. In other embodiments, the frame 51 may define a through hole therein. The fingerprint identification component 100 may be mounted in the through hole, and the fingerprint of user may be collected through the through hole.

Figure 5:
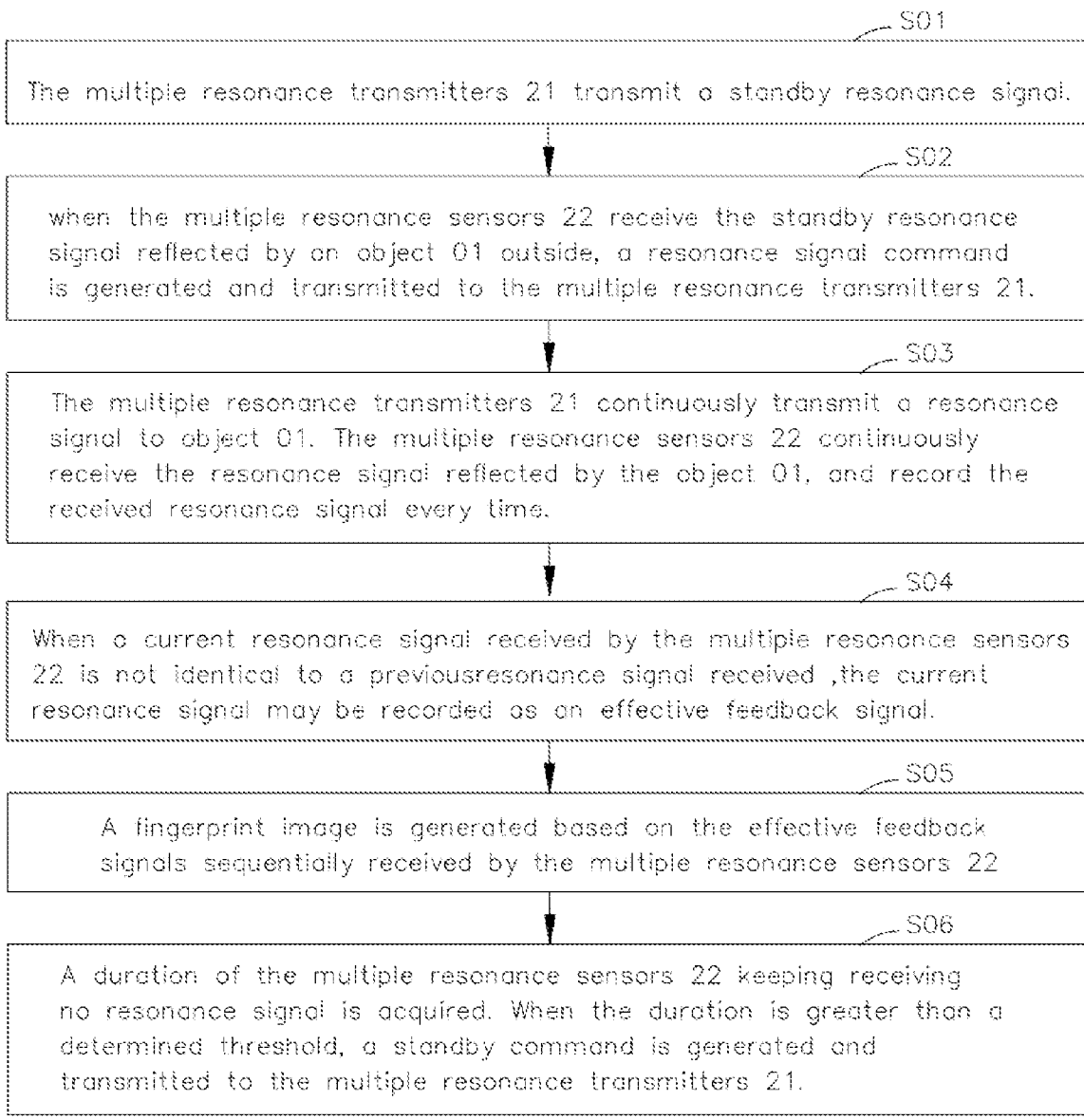
FIG. 5 illustrates a schematic flowchart of a fingerprint collection method an electronic device, in accordance with an embodiment of the present disclosure.

As illustrated in FIG. 1 and FIG. 5, a fingerprint collection method is provided in accordance with an embodiment of the present disclosure. The fingerprint collection method is applied in the fingerprint identification component 100 to collect a fingerprint of the user. The fingerprint collection method may begin from Block S01:

Block S01: The multiple resonance transmitters 21 transmit a standby resonance signal.

In this embodiment, by transmitting a low-level signal to the multiple resonance transmitters 21, the multiple resonance transmitters 21 continuously transmit the standby resonance signal. The standby resonance signal may be a weak laser signal, and the weak laser signal may only be transmitted for a predetermined distance. That is, the standby resonance signal transmitted by the multiple resonance transmitters 21 is only transmitted within a predetermined range with respect to the fingerprint identification component 100. Because a power consumption of the standby resonance signal is weak, the fingerprint identification component 100 consumes less energy, and the fingerprint identification component 100 can be maintained in an energy-saving standby state. In other embodiments, only one or a partial of the resonance transmitters 21 may emit a standby resonance signal, thereby further reducing a power consumption of the fingerprint identification component 100.

Block S02: When the multiple resonance sensors 22 receive the standby resonance signal reflected by an object 01 outside, a resonance signal command is generated and transmitted to the multiple resonance transmitters 21.

The object 01 (as illustrated in FIG. 2) may be any object in the outside of the fingerprint identification component 100. For example, the object 01 may be a finger of a user. The object 01 may move on the transparent cover 54. When the standby resonance signal reaches the object 01, the standby resonance signal is reflected by the object 01 and transmitted to the multiple resonance sensors 22.

In this embodiment, when a finger of user approaches the fingerprint identification component 100, the standby resonance signal emitted by the multiple resonance transmitters 21 may arrive to the finger, and then the standby resonance signal is reflected by the finger. The multiple resonance sensors 22 can receive the standby resonance signal reflected by the finger. When the multiple resonance sensors 22 receive the standby resonance signal reflected by the finger, the multiple resonance transmitters 21 is triggered to a fingerprint collection state. That is, a transmitting resonance signal command is generated and sent to the multiple resonance transmitters 21. So that the multiple resonance transmitters 21 are switched into a fingerprint collection state.

Conversely, when there is no finger or object approaching the fingerprint identification component 100, the standby resonance signal emitted by the multiple resonance transmitters 21 cannot be reflected to the multiple resonance sensors 22. Thereby the multiple resonance sensors 22 cannot receive the standby resonance signal reflected by any finger or object, and then the multiple resonance transmitters 21 will not be triggered. Thus the multiple resonance transmitters 21 keep transmitting the standby resonance signal.

Block S03: The multiple resonance transmitters 21 continuously transmit a resonance signal to the object 01. The multiple resonance sensors 22 continuously receive the resonance signal reflected by the object 01, and record the received resonance signal every time.

In this embodiment, the multiple resonance transmitters 21 begin to continuously transmit a resonance signal to the object 01 when receive the resonance signal command. The object 01 may be a finger of the user. The resonance signals are continuously transmitted by the multiple resonance transmitters 21, such that the multiple resonance sensors 22 continuously receive the resonance signals reflected by the object 01. So that a fingerprint information of a region of the finger facing the fingerprint collection region 10 may be continuously collected.

Block S04: When a current resonance signal received by the multiple resonance sensors 22 is not identical to a previous resonance signal received, the current resonance signal may be recorded as an effective feedback signal.

When the object 01 approaches the multiple fingerprint collection modules 20, a region on the fingerprint texture of the object 01 may face fingerprint collection region 10. In the present embodiment, because the fingerprint of the object 01 has a continuous fluctuation of a multiple peaks and a multiple troughs, when the object 01 moves with respect to the fingerprint collection region 10, the fingerprint of the region of the object 01 are being moved with respect to the multiple fingerprint collection modules 20. Such that resonance signals will be reflected by different regions of the object 01 when the object 01 is moving, resulting that the resonance signals received by the multiple resonance sensors 22 are varied.

In some embodiment, the object 01 moves along a direction perpendicular to the longitudinal direction of the fingerprint collection region 10. When the resonance signal currently received by the multiple resonance sensors 22 is different from the resonance signal received last time, the object 01 is considered to be moved with respect to the fingerprint collection region 10. Thus, the resonance signal received by the multiple resonance sensors 22 is considered as an effective feedback signal.

Block S05: A fingerprint image is generated based on the effective feedback signals successively received by the multiple resonance sensors 22.

In this embodiment, the effective feedback signals received by the multiple resonance sensors 22 in sequence is encoded with the fingerprint information of a multiple regions of the object 01, when the object 01 moves on the fingerprint collection region 10. The fingerprint of the object 01 may be generated by integrating the fingerprint information of the multiple regions.

Block S06: A duration of the multiple resonance sensors 22 keeping receiving no resonance signal is acquired. When the duration is greater than a predetermined threshold, a standby command is generated and transmitted to the multiple resonance transmitters 21.

When the multiple resonance sensors 22 keep continuously receiving no resonance signal for a time greater than the predetermined threshold, the object 01 is considered to move away from the fingerprint identification component 100. Such that the multiple resonance transmitters 21 are switched out of the fingerprint collection state. Thereby the multiple resonance transmitters are switched in to a standby state.

In the fingerprint identification component, the electronic device and the fingerprint collection method of the present disclosure, the fingerprint identification component defines a micro-slit fingerprint collection region. A multiple fingerprint collection modules are arranged in the micro-slit fingerprint collection region. Each of the fingerprint collection modules includes a resonance transmitter and a resonance sensor. The resonance transmitter is configured to transmit a resonance signal to a fingerprint texture of a user. The resonance sensor is configured to receive the resonance signal after being reflected by the fingerprint texture. Such that a fingerprint image of the user is generated based on the reflected resonance signal. Thereby the fingerprint identification component can collect the fingerprint of the user. A space occupied by the fingerprint identification component is effectively reduced, thereby improving the user experience.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic device, comprising:
a housing comprising a frame, a front cover, a rear cover, and a transparent cover; the front cover covering a front side of the frame; the rear cover covering a rear side of the frame; and the frame forming a resonance signal transmission region thereon; wherein the frame comprising an outer surface and an interior surface opposite to the outer surface; the frame defines a slit corresponding to the resonance signal transmission region and a receiving depression communicating with the slit, and the receiving depression is exposed in the interior surface of the frame, and the slit is exposed in the outer surface of the frame; the frame comprises a step disposed on a bottom surface of the receiving depression; wherein the transparent cover comprises an embedded portion embedded in the slit and a flange stacked on the step; the embedded portion comprises an exterior surface aligned with the exterior surface of the frame;
a main board, disposed between the front cover and the rear cover; and
a fingerprint identification component comprising:
a substrate disposed in the receiving depression, a circuit board coupled to a surface of the substrate departing away from the slit, and a plurality of fingerprint collection modules assembled onto the substrate and opposite to the slit; wherein the circuit board is coupled to the plurality of fingerprint collection modules via the substrate, and a portion of the circuit board is bent to be coupled to the main board; and each of the fingerprint collection modules having:
a resonance transmitter configured to transmit a resonance signal to pass through the resonance signal transmission region and arrive to a fingerprint texture of a user; and
a resonance sensor configured to receive the resonance signal reflected by the fingerprint texture of the user to collect or identify a fingerprint of the user.

2. The electronic device as claimed in claim 1, wherein the fingerprint identification component further comprises a light guide lens on a side of the plurality of fingerprint collection modules to guide the resonance signals transmitted or received by fingerprint collection modules.

3. The electronic device as claimed in claim 1, wherein the front cover covers the fingerprint identification component.

4. The electronic device as claimed in claim 1, wherein the rear cover covers the fingerprint identification component.

5. The electronic device as claimed in claim 1, wherein the circuit board is a flexible printed circuit board.

6. The electronic device as claimed in claim 1, wherein the exterior surface of the embedded portion is a curved surface.

7. The electronic device as claimed in claim 1, wherein a longitudinal direction of the slit is parallel to a longitudinal direction of the frame.

8. The electronic device as claimed in claim 1, wherein the plurality of fingerprint collection modules are arranged in a row along a longitudinal direction of the slit.

9. The electronic device as claimed in claim 1, wherein the resonance transmitter is a laser transmitter, and the resonance sensor is a laser sensor.

10. The electronic device as claimed in claim 1, wherein the plurality of fingerprint collection modules are arranged in a row along a longitudinal direction of the resonance signal transmission region.

11. The fingerprint identification component as claimed in claim 10, wherein the resonance transmitter and the resonance sensor of each of the fingerprint collecting modules are arranged in a row along the longitudinal direction of the resonance signal transmission region; and the resonance sensors of the plurality of the fingerprint collection modules are separated from each other by one resonance transmitter, and the resonance transmitters of the plurality of the fingerprint collection modules are separated from each other by one resonance sensor.

12. The fingerprint identification component as claimed in claim 1, wherein the resonance transmitter and the resonance sensor of each of the fingerprint collecting modules are arranged either perpendicular or parallel to the longitudinal direction of the resonance signal transmission region.

13. The fingerprint identification component as claimed in claim 1, wherein the resonance transmitters and the resonance sensors are arranged on a same plane.

14. The fingerprint identification component as claimed in claim 1, the outer surface is a curve surface; the slit is located at a portion of a maximum curvature of the outer surface.

15. An electronic device, comprising:

a housing comprising a frame, a front cover, and a rear cover; the front cover covering a front side of the frame; the rear cover covering a rear side of the frame; and the frame forming a resonance signal transmission region thereon; wherein the frame defines a slit corresponding to the resonance signal transmission region and a receiving depression communicated with the slit, the receiving depression is exposed in an interior surface of the frame;

a main board, disposed between the front cover and the rear cover; and a fingerprint identification component comprising a substrate disposed in the receiving depression, a circuit board coupled to a surface of the substrate departing away from the slit, and a plurality of fingerprint collection modules assembled onto the substrate and opposite to the slit; wherein the circuit board is coupled to the plurality of fingerprint collection modules via the substrate, and a portion of the circuit board is in contact with the interior surface of the frame, and another portion of the circuit board is bent to be coupled to the main board; and each of the fingerprint collection modules having:

a resonance transmitter configured to transmit a resonance signal to pass through the resonance signal transmission region and arrive to a fingerprint texture of a user; and a resonance sensor configured to receive the resonance signal reflected by the fingerprint texture of the user to collect or identify a fingerprint of the user.

16. The electronic device as claimed in claim 15, wherein the fingerprint identification component further comprises a light guide lens on a side of the plurality of fingerprint collection modules to guide the resonance signals transmitted or received by fingerprint collection modules.

17. The electronic device as claimed in claim 15, wherein the housing further comprises a transparent cover embedded in the slit.

18. The electronic device as claimed in claim 17, wherein the frame comprises a step disposed on a bottom surface of the receiving depression; the transparent cover comprises an embedded portion embedded in the slit and a flange stacked on the step.

19. The electronic device as claimed in claim 18, the frame comprises an outer surface; the embedded portion comprises an exterior surface; the exterior surface is a curved surface; the exterior surface is aligned with the outer surface.

20. An electronic device, comprising:

a housing comprising a frame, a front cover, and a rear cover; the front cover covering a front side of the frame; the rear cover covering a rear side of the frame; the frame comprising an outer surface and an interior surface opposite to the outer surface; wherein the frame defines a slit and a receiving depression communicated with the slit, the receiving depression is exposed in an interior surface of the frame, and the slit is exposed in the outer surface;

a main board, disposed between the front cover and the rear cover; and a fingerprint identification component comprising a substrate disposed in the receiving depression, a circuit board coupled to a surface of the substrate departing away from the slit, a plurality of fingerprint collection modules assembled onto the substrate and opposite to the slit, and a light guide lens on a side of the plurality of fingerprint collection modules to guide the resonance signals transmitted or received by fingerprint collection modules;

wherein the circuit board is coupled to the plurality of fingerprint collection modules via the substrate, and a portion of the circuit board is bent to be coupled to the main board; and each of the fingerprint collection modules having:

a resonance transmitter configured to transmit a resonance signal to pass through the resonance signal transmission region and arrive to a fingerprint texture of a user; and a resonance sensor configured to receive the resonance signal reflected by the fingerprint texture of the user to collect or identify a fingerprint of the user.

* * * * *